United States Patent
Kiyomoto et al.

(10) Patent No.: US 9,896,589 B2
(45) Date of Patent: *Feb. 20, 2018

(54) INK COMPOSITION FOR INKJET RECORDING

(71) Applicant: TOSHIBA TEC KABUSHIKI KAISHA, Shinagawa-ku, Tokyo (JP)

(72) Inventors: Hiroshi Kiyomoto, Kanagawa (JP); Takaya Kitawaki, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/017,878

(22) Filed: Feb. 8, 2016

(65) Prior Publication Data
US 2016/0280943 A1     Sep. 29, 2016

(30) Foreign Application Priority Data
Mar. 27, 2015    (JP) .................. 2015-066484

(51) Int. Cl.
| C09D 11/322 | (2014.01) |
| C09D 11/102 | (2014.01) |
| C09D 11/107 | (2014.01) |

(52) U.S. Cl.
CPC .......... *C09D 11/322* (2013.01); *C09D 11/102* (2013.01); *C09D 11/107* (2013.01)

(58) Field of Classification Search
CPC .................................................. C09D 11/322
See application file for complete search history.

(56) References Cited

U.S. PATENT DOCUMENTS

| 7,696,262 B2 | 4/2010 | Cagle et al. |
| 7,708,821 B2 | 5/2010 | Kiyomoto et al. |
| 8,500,264 B2 | 8/2013 | Mukai et al. |
| 2001/0025588 A1* | 10/2001 | Takemoto ............... C09D 11/38 106/31.36 |
| 2010/0227958 A1 | 9/2010 | Idemura et al. |
| 2011/0318551 A1* | 12/2011 | Nakagawa ............... B01J 13/02 428/206 |
| 2013/0245157 A1* | 9/2013 | Kuriyama ............... C09D 11/30 523/201 |
| 2014/0349087 A1 | 11/2014 | Jung et al. |
| 2015/0148469 A1* | 5/2015 | Kiyomoto ............... C09D 11/38 524/376 |

FOREIGN PATENT DOCUMENTS

| EP | 2623567 | 8/2013 |
| JP | 2002-235023 | 8/2002 |
| JP | 2003-082024 | 3/2003 |
| JP | 2007-119708 | 5/2007 |
| JP | 2007-254735 | 10/2007 |
| JP | 2012-025947 | 2/2012 |
| JP | 2012092224 A * | 5/2012 |
| JP | 2012-158624 | 8/2012 |
| JP | 2012-201814 | 10/2012 |
| JP | 2014-214160 | 11/2014 |

OTHER PUBLICATIONS

Machine translation of JP 2012-092224 A, May 17, 2012.*
Japanese Office Action for Japanese Patent Application No. 2015-066484 dated May 9, 2017.

* cited by examiner

*Primary Examiner* — Vickey Nerangis
(74) *Attorney, Agent, or Firm* — Amin, Turocy & Watson LLP

(57) ABSTRACT

According to an embodiment, an ink composition for inkjet recording comprises a dispersion medium that contains water and glycol ether of which boiling point is equal to or greater than 220 degrees centigrade, a pigment and a core-shell particle that includes a core consisting of hydrophobic acrylic resin and a shell consisting of at least one of aqueous urethane resin and acrylic graft aqueous urethane resin.

14 Claims, 1 Drawing Sheet

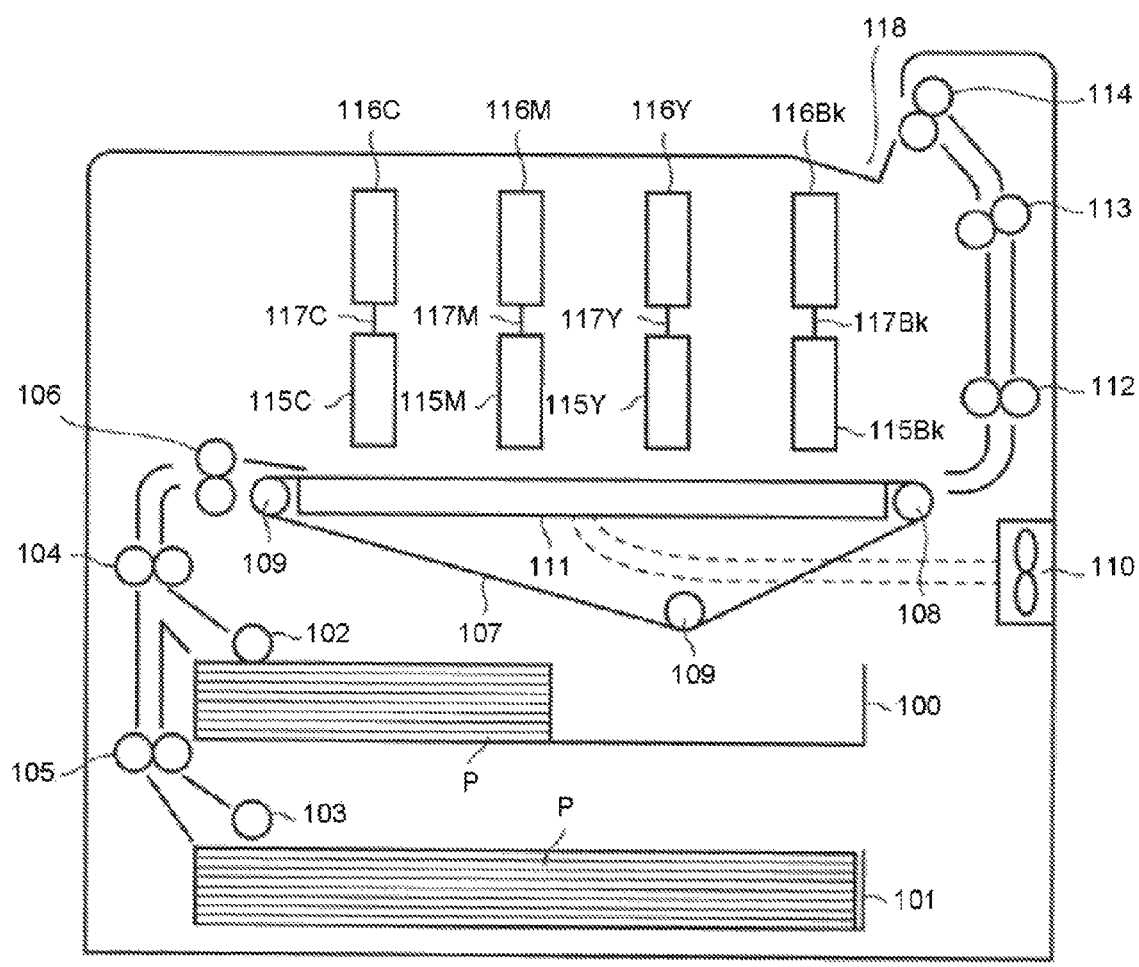

INK COMPOSITION FOR INKJET RECORDING

CROSS-REFERENCE TO RELATED APPLICATION

This application is based upon and claims the benefit of priority from Japanese Patent Application No. 2015-066484, filed Mar. 27, 2015, the entire contents of which are incorporated herein by reference.

FIELD

Embodiments described herein relate generally to an ink composition for inkjet recording.

BACKGROUND

An ink-jet recording method makes fine ink droplets fly and makes the fine ink droplets adhere to an image receiving medium to print. The method is characterized by printing a high-quality image with a high resolution at a high speed. The ink-jet recording method is applied to a printer for normal paper printing used in an office or a printer for industry such as a label printer.

In recent years, inkjet ink that uses a pigment-based coloring agent instead of a dye-based coloring agent is popular as inkjet ink to be used in the printer for industry. This is because that the ink which uses pigment is excellent in water-resistance property and light-resistance property when compared with the ink which uses dye.

DESCRIPTION OF THE DRAWINGS

FIG. 1 is a diagram schematically exemplifying an inkjet recording apparatus usable in inkjet recording that uses an ink composition according to an embodiment.

DETAILED DESCRIPTION

In accordance with an embodiment, an ink composition for inkjet recording comprises a dispersion medium that contains water and glycol ether of which boiling point is equal to or greater than 220 degrees centigrade, a pigment, and a core-shell particle that includes a core consisting of hydrophobic acrylic resin and a shell consisting of at least one of aqueous urethane resin and acrylic graft aqueous urethane resin.

Hereinafter, the ink composition for inkjet recording and a recording method that uses the ink composition according to the embodiment is described.

<Ink Composition for Inkjet Recording>

The ink composition for inkjet recording according to the embodiment comprises the dispersion medium, the pigment and the core-shell particle. The pigment or the core-shell particle and the dispersion medium forms or form suspension or emulsion. The ink composition may further comprise an addition agent such as a pigment dispersant and the like.

The ink composition has a viscosity suitable to the ejection of ink from a nozzle head of an inkjet recording apparatus, such as an inkjet printer. As an example, the viscosity of the ink composition at 25 degrees centigrade is equal to or smaller than 20 mPa·s.

Hereinafter, each component of the ink composition is described.

[Pigment]

The pigment is dispersed in the dispersion medium.

Either of an inorganic pigment and an organic pigment may be used as the pigment.

As the inorganic pigment, titanium oxide, aluminum pigment and iron oxide are exemplified. These inorganic pigments may be used together with carbon black manufactured with a well-known method such as a contact method, a furnace method, and a thermal method.

As the organic pigment, azo pigment including azo lake pigment, insoluble azo pigment, condensed azo pigment and chelate azo pigment; polycyclic pigment such as phthalocyanine pigment, perylene pigment, perinone pigment, anthraquinone pigment, quinacridone pigment, dioxazine pigment, thioindigo pigment, isoindolinone pigment and quinophthalone pigment; dye chelates such as basic dye chelates and acid dye chelates; nitro pigment; nitroso pigment; or aniline black can be used.

In a case of obtaining a yellow ink composition, it is preferred to use pigment yellow 155 as the pigment.

Pigment yellow 74 is mainly used as yellow pigment of ink composition for inkjet recording. This is because that it is considered that the pigment yellow 74 is excellent in color developing property and dispersion stability. However, the pigment yellow 74 has lower light-resistance property. Thus, a printed matter manufactured with the ink composition containing the pigment yellow 74 is unsuitably used outdoors.

The pigment yellow 155 is also excellent in light-resistance property in addition to having sufficient color developing property and dispersion stability. Thus, the ink composition containing the pigment yellow 155 is suitable to manufacture a printed matter used outdoors in particular.

Only one kind of pigment can be used. Alternatively, more than two kinds of pigments may be used. For example, the pigment yellow 155 may be used as the main pigment, and other one or more pigments may be used as auxiliary pigments. If the auxiliary pigment is used, color tone can be adjusted.

A pigment which can be dispersed by itself may be used as the pigment. The self-dispersed pigment refers to the pigment that can be dispersed in water without dispersant by performing a surface processing on the pigment. Herein, the surface processing is, for example, a vacuum plasma processing, a diazo coupling processing, or an oxidation processing. Through the surface processing, the pigment is combined with, for example, at least one kind of functional group or salt thereof of carbonyl group, carboxyl group, hydroxyl group, and sulfonic group. For example, the functional group or molecule containing the functional group is grafted onto the surface of the pigment. In this way, affinity of the pigment for water is increased and the pigment can be dispersed in water without dispersant.

In a case of using the self-dispersed pigment, an undermentioned pigment dispersant may be used together. As stated above, the self-dispersed pigment can be dispersed in a dispersion medium such as water without dispersant. However, in a case in which a substance with high hydrophobicity or the core-shell particle exists in such a dispersion medium, as time elapses, the particle diameter of the pigment is increased or the pigment aggregates and then sinks. If the self-dispersed pigment and the pigment dispersant are used together, even in a case in which the substance with high hydrophobicity or the core-shell particle exists in the dispersion medium, as time elapses, the increase of the particle diameter of the pigment or the aggregation and sinking of the pigment can be suppressed.

The average particle diameter of the pigment is within a range, for example, from 30 to 300 nm, typically, from 50 to 200 nm.

The average particle diameter of the pigment can be measured with the use of a particle size distribution meter with a dynamic light scattering method. An HPPS (manufactured by Malvern Instruments Ltd) is exemplified as the particle size distribution meter.

The ratio of the pigment to the ink composition is preferably within a range from 2 to 15 mass %, and more preferably within a range from 3 to 10 mass %. If the ratio becomes small, it becomes difficult to achieve high image density. If the ratio becomes large, storage stability of the ink composition is lowered, and meanwhile failure occurs in the ejection of ink.

[Core-Shell Particle]

The core-shell particle is dispersed in the dispersion medium.

The core-shell particle includes the core and the shell encircling the core. The core consists of the hydrophobic acrylic resin. The shell consists of at least one of aqueous urethane resin and acrylic graft aqueous urethane resin.

The core-shell particle plays a role of a fixing agent. Even in a case in which the image receiving medium is impermeable, the core-shell particle can be used to form a printed layer that is excellent in adhesiveness to the image receiving medium. Further, the core-shell particle makes scratch resistance of the printed layer enhanced.

The ratio of the core-shell particle to the ink composition is preferably within a range from 1 to 40 mass %, more preferably within a range from 1 to 30 mass %, and most preferably within a range from 3 to 20 mass %.

The core-shell particle exists as, for example, dispersed phase of water-based resin emulsion of which continuous phase is water before mixing with the pigment. The ink composition is obtained by, for example, mixing the water-based resin emulsion with other component such as the pigment.

[Dispersion Medium]

The dispersion medium is aqueous solution that contains water and glycol ether.

The glycol ether used in here has a boiling point equal to or greater than 220 degrees centigrade. As the glycol ether, for example, diethylene glycol isobutyl ether, diethylene glycol monobutyl ether, tripropylene glycol monomethyl ether or triethylene glycol monobutyl ether can be used.

These glycol ether is difficult to volatilize as the boiling point is high. Further, these glycol ether is excellent in resolubility of the foregoing emulsion or suspension. Thus, in a case of using the ink composition, drying of the ink composition in the vicinity of a nozzle of an inkjet head can be suppressed. Therefore, it is possible to reduce labor required to maintain the inkjet recording apparatus.

The ratio of the foregoing glycol ether to the dispersion medium is preferably within a range from 0.5 to 15 mass %, more preferably within a range from 0.5 to 10 mass %, and most preferably within a range from 0.5 to 5 mass %. In a case in which the ratio is small, the foregoing effect is reduced. In a case in which the ratio is large, there is a possibility that the fixing property is lowered.

(Wetting Agent)

The dispersion medium may further include a wetting agent that prevents the ink composition from drying. A water-soluble liquid wetting agent, for example, polyhydric alcohol, nitrogen-containing heterocyclic compound, amines, or sulfur-containing compound can be used as a wetting agent. These liquid wetting agents also have an effect on enhancement of the dispersion stability of the pigment in the ink composition.

As the polyhydric alcohol, ethylene glycol, diethylene glycol, triethylene glycol, polyethylene glycol, dipropylene glycol, polypropylene glycol, 1,5-pentanediol, 1,6-hexanediol, glycerol, 1,2,6-hexanetriol, 1,2,4-butanetriol, 1,2,3-butanetriol, and 3-methyl-1,3,5-pentane triol are exemplified.

As the nitrogen-containing heterocyclic compound, N-methyl-2-pyrrolidone, N-hydroxyethyl-2-pyrrolidone, 2-pyrrolidone, 1,3-dimethyl imidazolidinone, and ε-caprolactam are exemplified.

As the amines, monoethanolamine, diethanolamine, triethanolamine, monoethylamine, diethylamine, and triethylamine are exemplified.

As the sulfur-containing compound, dimethyl sulfoxide, sulfolane, and thiodiethanol are exemplified.

Propylene carbonate, ethylene carbonate, and γ-butyrolactone are exemplified as a liquid wetting agent in addition to the polyhydric alcohol, the nitrogen-containing heterocyclic compound, the amines and the sulfur-containing compound.

Among these wetting agents, compared with other wetting agents, the glycerin has higher water retention and is difficult to volatilize as the boiling point thereof is higher. Thus, it is preferred to use the glycerin as at least part of the wetting agent.

The concentration of the wetting agent in the ink composition is preferably from 1 to 40 mass %, and more preferably from 2 to 40 mass %.

One kind of the wetting agent may be used; alternatively, equal to or greater than two kinds of wetting agents may be combined to be used. Further, in order to further enhance wetting effect, the above-mentioned liquid wetting agent and a solid wetting agent such as urea, thiourea and ethylene urea may be used together. It is preferred that the ratio of the solid wetting agent to the whole of the wetting agent is equal to or smaller than 30 mass %.

(Pigment Dispersant)

The dispersion medium can further contain a pigment dispersant (or a discharge stabilizer). The pigment dispersant is, for example, a polymer dispersant or surfactant.

As the polymer dispersant, polyvinyl alcohol, polyvinyl pyrrolidone, polyacrylic acid, acrylic acid-acrylonitrile copolymer, acrylic acid-acrylic acid ester copolymer, styrene-acrylic acid copolymer, styrene-methacrylic acid copolymer, and styrene-maleic acid copolymer are exemplified.

As the surfactant, a anionic surfactant such as fatty acid salts, higher alkyl dicarboxylic acid salts, higher alcohol sulfuric ester salts, higher alkyl sulfonates, condensates of higher fatty acid and amino acid, sulfosuccinic acid ester salts, naphthenic acid salts, liquid fatty oil sulfuric ester salts, alkyl aryl sulfonate, polyoxyethylene alkyl ether carboxylates, polyoxyethylene alkyl ether sulfate and polyoxyethylene alkyl ether phosphoric salt is exemplified.

As the surfactant, a non-ionic surfactant such as polyoxyethylene alkyl ethers, polyoxyethylene alkyl esters, sorbitan alkyl esters, polyoxyethylene sorbitan alkyl esters and acetylene glycols may be used.

Among these surfactants, a polyoxyethylene anionic surfactant such as polyoxyethylene alkyl ether carboxylate, polyoxyethylene alkyl ether sulfate and polyoxyethylene alkyl ether phosphate is preferable. If such a surfactant is used as the pigment dispersant, as time elapses, the increase of the particle diameter of the pigment and the aggregation and sinking of the pigment can be suppressed. Thus, very excellent storage stability is achievable.

The amount of the pigment dispersant is preferably within a range from 1 to 50 mass %, and more preferably within a range from 5 to 40 mass % with respect to the pigment.

(Another Addition Agent)

The dispersion medium can further contain another addition agent. For example, the dispersion medium may further contain a surface tension adjusting agent.

The above-mentioned non-ionic surfactant may be used as the surface tension adjusting agent. As the surface tension adjusting agent, polyoxyethylene alkyl ethers, polyoxyethylene alkyl esters, sorbitan alkyl esters, polyoxyethylene sorbitan alkyl esters, and acetylene glycols are exemplified. Further, a silicon-based surfactant or a fluorine-containing surfactant may be used as the surface tension adjusting agent.

The concentration of the surface tension adjusting agent in the ink composition is preferably within a range from 0.5 to 3 mass %.

The dispersion medium may further contain a pH adjusting agent or antiseptic or fungicide.

As the pH adjusting agent, sodium hydroxide, potassium hydroxide, potassium dihydrogen phosphate, and disodium hydrogen phosphate are exemplified.

As the antiseptic or fungicide, sodium benzoate, sodium pentachlorophenol, sodium 2-pyridine thiol-1-oxide, sodium sorbate, sodium hydrochloride acetate, and 1,2-dibenzo soviet thiazoline-3-on are exemplified.

<Recording Method>

For example, an inkjet recording apparatus shown in FIG. 1 can be used in the inkjet recording with the foregoing ink composition.

The inkjet recording apparatus shown in FIG. 1 is provided with a housing in which a paper discharge tray 118 is arranged. In the housing, cassettes 100 and 101, paper feed rollers 102 and 103, conveyance roller pairs 104 and 105, a resist roller pair 106, a conveyance belt 107, a fan 110, a negative pressure chamber 111, conveyance roller pairs 112, 113 and 114, inkjet heads 115C, 115M, 115Y and 115Bk, ink cartridges 116C, 116M, 116Y and 116Bk, and tubes 117C, 117M, 117Y and 117Bk are arranged.

The cassettes 100 and 101 separately house image receiving mediums P of which sizes are different. The paper feed roller 102 or 103 takes out an image receiving medium P corresponding to the selected size of an image receiving medium from the cassette 100 or 101 and conveys the image receiving medium P to conveyance roller pairs 104 and 105 and the resist roller pair 106.

The conveyance belt 107 is applied with tension under the effect of a driving roller 108 and two driven rollers 109. Holes are arranged on the surface of the conveyance belt 107 at specific intervals. The negative pressure chamber 111 connected to the fan 110 is arranged inside the conveyance belt 107 so as to enable the conveyance belt 107 to adsorb the image receiving medium P. The conveyance roller pairs 112, 113 and 114 are arranged at the downstream side of the conveyance belt 107 in the conveyance direction. Further, a heater that is used to heat the printed layer formed on the image receiving medium P can be arranged in the conveyance path from the conveyance belt 107 to the paper discharge tray 118.

Four columns of inkjet heads that eject ink to the image receiving medium P according to image data are arranged above the conveyance belt 107 in the order of the inkjet head 115C that ejects cyan (C) ink, the inkjet head 115M that ejects magenta (M) ink, the inkjet head 115Y that ejects yellow (Y) ink, and the inkjet head 115Bk that ejects black (Bk) ink from the upstream side.

The cyan (C) ink cartridge 116C, the magenta (M) ink cartridge 116M, the yellow (Y) ink cartridge 116Y, and the black (Bk) ink cartridge 116Bk that respectively house corresponding ink are arranged above of the inkjet heads 115C, 115M, 115Y and 115Bk. These cartridges 116C, 116M, 116Y and 116Bk are respectively connected with the inkjet heads 115C, 115M, 115Y and 115Bk through the tubes 117C, 117M, 117Y and 117Bk.

An ink composition stored in at least one of the ink cartridges 116C, 116M, 116Y and 116Bk is the ink composition according to the embodiment. Herein, as an example, any one of ink compositions respectively stored in the ink cartridges 116C, 116M, 116Y and 116Bk is assumed as the ink composition according to the embodiment.

Next, an image forming operation carried out by the inkjet recording apparatus is carried out.

First, an image processing module (not shown) starts an image processing for recording and generates a control signal for controlling operations of various rollers and the negative pressure chamber 111 while generating an image signal corresponding to the image data.

The paper feed roller 102 or 103 takes out image receiving mediums P corresponding to the selected size one by one from the cassette 100 or 101 under the control of the image processing module, and conveys the image receiving medium P to the conveyance roller pairs 104 and 105 and the resist roller pair 106. The resist roller pair 106 corrects skew of the image receiving medium P, and conveys the corrected image receiving medium P at a specific timing.

The negative pressure chamber 111 inhales air through the holes on the conveyance belt 107. Thus, the image receiving medium P which is in a state of being adsorbed on the conveyance belt 107 is conveyed through positions below the inkjet heads 115C, 115M, 115Y and 115Bk in order accompanying with the move of the conveyance belt 107.

The inkjet heads 115C, 115M, 115Y and 115Bk eject ink in synchronization with the timing when the image receiving medium P is conveyed under the control of the image processing module. In this way, a color image is formed at a desired position on the image receiving medium P.

Afterwards, the conveyance roller pairs 112, 113 and 114 discharge the image receiving medium P on which the color image is formed to the paper discharge tray 118. In a case in which the heater is arranged in the conveyance path from the conveyance belt 107 to the paper discharge tray 118, the printed layer formed on the image receiving medium P may be heated by the heater. If the heating operation is carried out by the heater on the printed layer, in particular, in a case in which the image receiving medium P is impermeable, the adhesiveness of printed layer to the image receiving medium P can be enhanced.

As stated above, in this inkjet recording apparatus, any one of ink compositions respectively stored in the ink cartridges 116C, 116M, 116Y and 116Bk is the ink composition according to the embodiment. Thus, not only in a case in which the image receiving medium P is permeable like a paper, but also in a case in which the image receiving medium P is impermeable, for example, even in a case in which the image receiving medium P has a smooth recording surface consisting of plastic, glass or metal, a printed layer excellent in adhesiveness can be formed. Further, any one of ink compositions respectively stored in the ink cartridges 116C, 116M, 116Y and 116Bk is the ink composition according to the embodiment; in this inkjet recording apparatus, it is difficult to cause drying of the ink composition nearby nozzles of the inkjet heads 115C, 115M, 115Y and 115Bk. Thus, the burden of maintaining this inkjet recording apparatus is reduced.

EXAMPLE

Hereinafter, a concrete example is recorded.
<Manufacture of Pigment Dispersion Liquid>

A mixed liquid obtained by mixing 25 pts·mass of pigment, 5 pts·mass of surfactant and 70 pts·mass of pure water is supplied to a dispersion processing carried out with a bead mill. Herein, the pigment yellow 155 is used as the pigment, and polyoxyethylene alkyl ether is used as the surfactant. Further, zirconia beads are used as grinding media of the bead mill.

Then, beads are removed from the dispersion liquid, and the dispersion liquid is supplied to a centrifugation processing and a filtration processing. A membrane filter of 1 μm is used in the filtration processing.

As stated above, yellow pigment dispersion liquid containing the pigment is obtained, wherein the ratio of the pigment to the yellow pigment dispersion liquid is 25 mass %.

<Manufacture of Ink Composition>

The pigment dispersion liquid and other components are mixed according to the combinations shown in the following table 1 to table 3. Further, in the table 1 to table 3, numerical values recorded in columns at the right side of columns for displaying components display contents (pts. mass) of these components.

Herein, ACRIT (registered trademark) WEM-202UH serving as water-based resin emulsion manufactured by Taisei Fine Chemical Co., Ltd. is used as core-shell particle source. Further, surfynol (registered trademark) 465 manufactured by Nissin Chemical Industry Co., Ltd. is used as a discharge stabilizer. Proxel (registered trademark) xL-2 manufactured by Lonza Inc. is used as the preservative.

The mixed liquid is stirred for an hour with the use of a stirrer, and then is filtrated with the membrane filter of 1 μm. In this way, an ink composition is obtained.

TABLE 1

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| PIGMENT DISPERSION AGENT | | 20 | 20 | 20 | 20 | 20 | 20 |
| WETTING AGENT | GLYCERIN | | | | | | |
| | PROPYLENE GLYCOL | 10 | 10 | 10 | 10 | 10 | 10 |
| | ETHYLENE GLYCOL | 5 | 5 | 5 | 5 | 5 | 5 |
| CORE-SHELL PARTICLE | | 10 | 10 | 10 | 10 | 1 | 30 |
| GLYCOL ETHER | TRIPROPYLENE GLYCOL MONOMETHYL ETHER (BOILING POINT: 242.4° C.) | 5 | | | | 5 | 5 |
| | DIETHYLENE GLYCOL MONO-ISOBUTYL ETHER (BOILING POINT: 220° C.) | | 5 | | | | |
| | DIETHYLENE GLYCOL MONOBUTYL ETHER (BOILING POINT: 230.6° C.) | | | 5 | | | |
| | TRIETHYLENE GLYCOL MONOMETHYL ETHER (BOILING POINT: 271.2° C.) | | | | 5 | | |
| | DIPROPYLENE GLYCOL MONOMETHYL ETHER (BOILING POINT: 187.2° C.) | | | | | | |
| | ETHYLENE GLYCOL MONO-BUTYL ETHER (BOILING POINT: 171.2° C.) | | | | | | |
| | ETHYLENE GLYCOL MONOMETHYL ETHER BOILING PONT: 124.5° C.) | | | | | | |
| | PROPYLENE GLYCOL MONOMETHYL ETHER (BOILING POINT: 121° C.) | | | | | | |
| DISCHARGE STABILIZER | SURFYNOL 465 | 1 | 1 | 1 | 1 | 1 | 1 |
| PRESERVATIVE | PROXEL xL-2(s) | 0.2 | 0.2 | 0.2 | 0.2 | 0.2 | 0.2 |
| | PURE WATER | REMNANT | REMNANT | REMNANT | REMNANT | REMNANT | REMNANT |
| | MAINTENANCE PROPERTY | ○ | ○ | ○ | ○ | ○ | ○ |
| | STORAGE STABILITY | ○ | ○ | ○ | ○ | ○ | ○ |
| ADHESIVENESS | VINYL CHLORIDE CARD | ○ | ○ | ○ | ○ | ○ | ○ |
| | PET FILM | ○ | ○ | ○ | ○ | ○ | ○ |
| | STAINLESS | ○ | ○ | ○ | ○ | ○ | ○ |
| | ALUMINUM | ○ | ○ | ○ | ○ | ○ | ○ |
| | GLASS | ○ | ○ | ○ | ○ | ○ | ○ |

TABLE 2

| | | EXAMPLE 7 | EXAMPLE 8 | EXAMPLE 9 | EXAMPLE 10 | EXAMPLE 11 |
|---|---|---|---|---|---|---|
| | PIGMENT DISPERSION AGENT | 20 | 20 | 20 | 20 | 20 |
| WETTING AGENT | GLYCERIN | | | | | 5 |
| | PROPYLENE GLYCOL | 10 | 10 | 10 | 10 | 10 |
| | ETHYLENE GLYCOL | 5 | 5 | 5 | 5 | 5 |
| | CORE-SHELL PARTICLE | 40 | 10 | 10 | 10 | 10 |
| GLYCOL ETHER | TRIPROPYLENE GLYCOL MONOMETHYL ETHER (BOILING POINT: 242.4° C.) | 5 | 0.5 | 10 | 15 | 5 |
| | DIETHYLENE GLYCOL MONO-ISOBUTYL ETHER (BOILING POINT: 220° C.) | | | | | |
| | DIETHYLENE GLYCOL MONOBUTYL ETHER (BOILING POINT: 230.6° C.) | | | | | |
| | TRIETHYLENE GLYCOL MONOMETHYL ETHER (BOILING POINT: 271.2° C.) | | | | | |
| | DIPROPYLENE GLYCOL MONOMETHYL ETHER (BOILING POINT: 187.2° C.) | | | | | |
| | ETHYLENE GLYCOL MONO-BUTYL ETHER (BOILING POINT: 171.2° C.) | | | | | |
| | ETHYLENE GLYCOL MONOMETHYL ETHER (BOILING POINT: 124.5° C.) | | | | | |
| | PROPYLENE GLYCOL MONOMETHYL ETHER (BOILING POINT: 121° C.) | | | | | |
| DISCHARGE STABILIZER | SURFYNOL 405 | 1 | 1 | 1 | 1 | 1 |
| PRESERVATIVE | PROXEL xL-2(s)[1] | 0.2 | 0.2 | 0.2 | 0.2 | 0.2 |
| | PURE WATER | REMNANT | REMNANT | REMNANT | REMNANT | REMNANT |
| | MAINTENANCE PROPERTY | ○ | ○ | ○ | ○ | ⊚ |
| | STORAGE STABILITY | Δ | ○ | ○ | Δ | ○ |
| ADHESIVENESS | VINYL CHLORIDE CARD | ○ | ○ | ○ | ○ | ○ |
| | PET FILM | ○ | ○ | ○ | ○ | ○ |
| | STAINLESS | ○ | ○ | ○ | ○ | ○ |
| | ALUMINUM | ○ | ○ | ○ | ○ | ○ |
| | GLASS | ○ | ○ | ○ | ○ | ○ |

TABLE 3

| | | EXAMPLE 12 | EXAMPLE 13 | EXAMPLE 14 | EXAMPLE 15 | EXAMPLE 16 | EXAMPLE 17 |
|---|---|---|---|---|---|---|---|
| | PIGMENT DISPERSION AGENT | 20 | 20 | 20 | 20 | 20 | 20 |
| WETTING AGENT | GLYCERIN | | | | | | |
| | PROPYLENE GLYCOL | 10 | 10 | 10 | 10 | 10 | 10 |
| | ETHYLENE GLYCOL | 5 | 5 | 5 | 5 | 5 | 5 |
| | CORE-SHELL PARTICLE | | 10 | 10 | 10 | 10 | 10 |
| GLYCOL ETHER | TRIPROPYLENE GLYCOL MONOMETHYL ETHER (BOILING POINT: 242.4° C.) | | | | | | 5 |
| | DIETHYLENE GLYCOL MONO-ISOBUTYL ETHER (BOILING POINT: 220° C.) | | | | | | |
| | DIETHYLENE GLYCOL MONOBUTYL ETHER (BOILING POINT: 230.6° C.) | | | | | | |
| | TRIETHYLENE GLYCOL MONOMETHYL ETHER (BOILING POINT: 271.2° C.) | | | | | | |
| | DIPROPYLENE GLYCOL MONOMETHYL ETHER (BOILING POINT: 187.2° C.) | | | 5 | | | |
| | ETHYLENE GLYCOL MONO-BUTYL ETHER (BOILING POINT: 171.2° C.) | | | | 5 | | |
| | ETHYLENE GLYCOL MONOMETHYL ETHER (BOILING POINT: 124.5° C.) | | | | | 5 | |
| | PROPYLENE GLYCOL MONOMETHYL ETHER (BOILING POINT: 121° C.) | | | | | | 5 |
| DISCHARGE STABILIZER | SURFYNOL 465 | 1 | 1 | 1 | 1 | 1 | 1 |
| PRESERVATIVE | PROXEL xL-2(s) | 0.2 | 0.2 | 0.2 | 0.2 | 0.2 | 0.2 |
| | PURE WATER | REMNANT | REMNANT | REMNANT | REMNANT | REMNANT | REMNANT |
| | MAINTENANCE PROPERTY | ○ | Δ | X | X | X | X |
| | STORAGE STABILITY | ○ | ○ | ○ | ○ | ○ | ○ |

TABLE 3-continued

TABLE 3

| | | EXAMPLE 12 | EXAMPLE 13 | EXAMPLE 14 | EXAMPLE 15 | EXAMPLE 16 | EXAMPLE 17 |
|---|---|---|---|---|---|---|---|
| ADHE-SIVENESS | VINYL CHLORIDE CARD | X | ◯ | ◯ | ◯ | ◯ | ◯ |
| | PET FILM | X | ◯ | ◯ | ◯ | ◯ | ◯ |
| | STAINLESS | X | ◯ | ◯ | ◯ | ◯ | ◯ |
| | ALUMINUM | X | ◯ | ◯ | ◯ | ◯ | ◯ |
| | GLASS | X | ◯ | ◯ | ◯ | ◯ | ◯ |

<Evaluation of Maintenance Property>

With the use of each of ink compositions shown in table 1 to table 3, the inkjet recording apparatus carries out a printing processing. In the printing processing, an inkjet recording apparatus manufactured by TOSHIBA TEC Corporation is used. After the printing processing, inkjet heads are fixed at a position separate from the home position, and placed for a whole day at a temperature condition of 25 degrees centigrade. Afterwards, the printing processing is carried out again, and stability of ejection of the inkjet heads is investigated. Then, the maintenance property is evaluated by comparing stability of ejection described above with the following standards. The evaluation results are collected in table 1 to table 3.

◎: ejection immediately after placed is unstable; however, immediate stable ejection is possible without a cleaning operation.

◯: ejection immediately after placed is unstable; however, stable ejection is possible with the cleaning operation within 2 times.

Δ: ejection immediately after placed is unstable; however, stable ejection is possible with the cleaning operation more than 3 times.

x: ejection immediately after placed is unstable; however, stable ejection is impossible even if the cleaning operation is repeated.

<Evaluation of Storage Stability>

Viscosity and surface tension of each of ink compositions shown in table 1 to table 3 are measured.

Further, 100 cc of each of ink compositions shown in table 1 to table 3 is measured, and put into a glass sample bottle. The bottle is sealed tightly, and stored for 60 days in a thermostatic bath of which temperature is set to 50 degrees centigrade. Then, viscosity and surface tension of the ink composition are measured, and whether or not there is precipitate in the ink composition is investigated.

Then, the storage stability is evaluated by comparing these results with the following standards. The evaluation results are collected in table 1 to table 3.

◯: there is almost no change in physical properties and no separation of the precipitate.

Δ: no large change in physical properties or no great amount of precipitate occurs, little change in physical properties is observed, or a small amount of precipitate occurs.

x: large change in physical properties or a great amount of precipitate occurs.

<Evaluation of Adhesiveness>

First, the inkjet recording apparatus carries out a printing processing with the use of each of ink compositions shown in table 1 to table 3.

Herein, a solid printing is carried out in a square-shaped area of which one side is 10 mm on an image receiving medium with the use of the inkjet recording apparatus that is equipped with a piezo head and manufactured by TOSHIBA TEC Corporation. A printed layer formed in this way is heated by a dryer over 10 seconds. At this time, the surface temperature of the image receiving medium is equal to or smaller than 50 degrees centigrade.

Further, an impermeable image receiving medium consisting of the following material is used as the image receiving medium.

Polyvinyl Chloride
Polyethylene Terephthalate
Stainless
Aluminum
Glass

Next, an adhesive tape is pasted on the printed layer, and the adhesive tape is rubbed by a finger three times. Scotch (registered trademark) mending tape 810 manufactured by Sumitomo 3M Ltd. is used as the adhesive tape. Then, the adhesive tape is peeled off, and the state of the printed layer is observed by sight. Further, adhesiveness is evaluated with reference to the state with the following standards.

◯: all the pigment does not fall off from the image receiving medium.

Δ: a small amount of pigment falls off from the image receiving medium.

x: a large amount of pigment falls off from the image receiving medium.

The present invention is not limited to the foregoing embodiment as it is, and can modify structure elements to embody them without departing from the spirit of the present invention at an execution stage. Further, various inventions can be formed through proper combinations of a plurality of structure elements disclosed in the foregoing embodiment. For example, several structure elements may be deleted from all structure elements shown in an embodiment. Furthermore, structure elements over different embodiments may be combined properly.

What is claimed is:

1. An ink composition for inkjet recording, comprising:
   a dispersion medium configured to contain water and glycol ether, wherein the dispersion medium contains only a glycol ether of which boiling point is equal to or greater than 220 degrees centigrade as glycol ether;
   a pigment; and
   a core-shell particle configured to include a core consisting of hydrophobic acrylic resin and a shell consisting of acrylic graft aqueous urethane resin.

2. The ink composition for inkjet recording according to claim 1, wherein the ratio of the core-shell particle to the ink composition is within a range from 1 to 30 mass %.

3. The ink composition for inkjet recording according to claim 2, wherein the ratio of the glycol ether to the ink composition is within a range from 0.5 to 10 mass %.

4. The ink composition for inkjet recording according to claim 1, wherein the ratio of the glycol ether to the ink composition is within a range from 0.5 to 10 mass %.

5. The ink composition for inkjet recording according to claim 1, wherein the glycol ether is tripropylene glycol monomethyl ether.

6. The ink composition for inkjet recording according to claim 1, wherein the dispersion medium further contains glycerin.

7. The ink composition for inkjet recording according to claim 1, wherein the pigment is pigment yellow 155.

8. An inkjet recording apparatus comprising:
an ink cartridge;
an ink composition stored in the ink cartridge, the ink composition comprising
   a dispersion medium configured to contain water and glycol ether, wherein the dispersion medium contains only a glycol ether of which boiling point is equal to or greater than 220 degrees centigrade as glycol ether,
   a pigment, and
   a core-shell particle configured to include a core consisting of hydrophobic acrylic resin and a shell consisting of acrylic graft aqueous urethane resin; and
an inkjet head configured to eject the ink composition provided by the ink cartridge.

9. The inkjet recording apparatus according to claim 8, wherein the ratio of the core-shell particle to the ink composition is within a range from 1 to 30 mass %.

10. The inkjet recording apparatus according to claim 9, wherein the ratio of the glycol ether to the ink composition is within a range from 0.5 to 10 mass %.

11. The inkjet recording apparatus according to claim 8, wherein the ratio of the glycol ether to the ink composition is within a range from 0.5 to 10 mass %.

12. The inkjet recording apparatus according to claim 8, wherein the glycol ether is tripropylene glycol monomethyl ether.

13. The inkjet recording apparatus according to claim 8, wherein the dispersion medium further contains glycerin.

14. The inkjet recording apparatus according to claim 8, wherein the pigment is pigment yellow 155.

* * * * *